No. 843,663.
PATENTED FEB. 12, 1907.
G. BULLOCK.
EYE EXERCISER.
APPLICATION FILED DEC. 4, 1905.
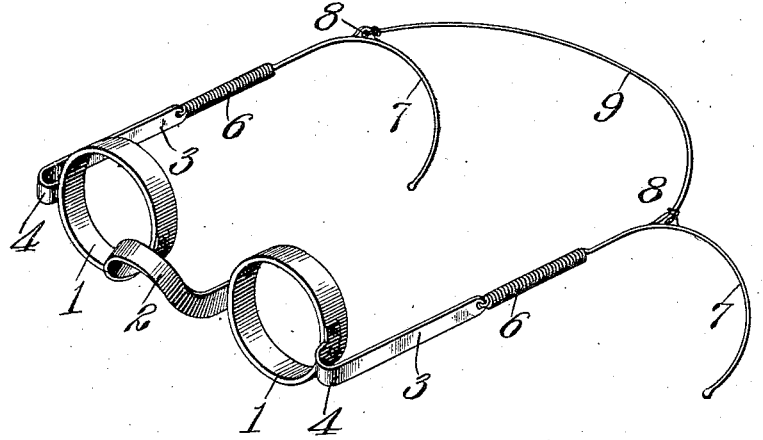
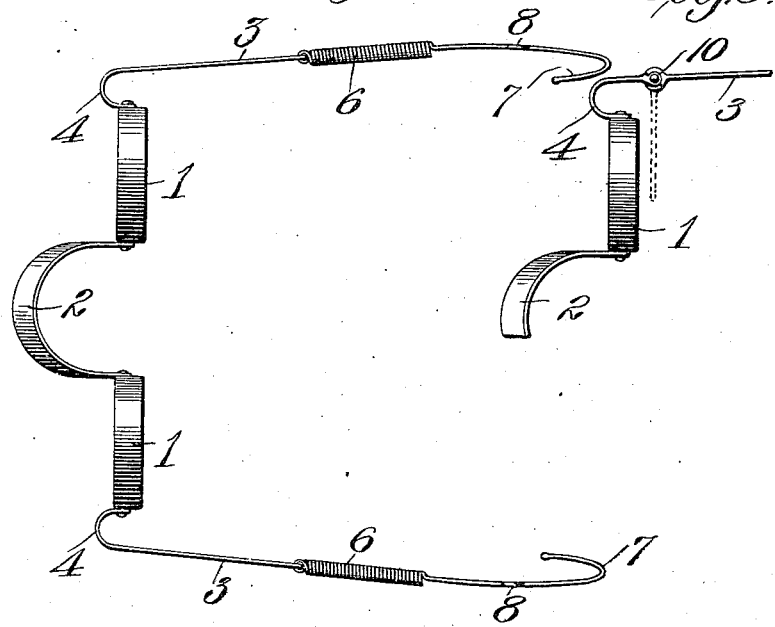
Witnesses:
Inventor:
George Bullock,
by J. D. Rippey, Atty.

UNITED STATES PATENT OFFICE.

GEORGE BULLOCK, OF POPLAR BLUFF, MISSOURI.

EYE-EXERCISER.

No. 843,663.  Specification of Letters Patent.  Patented Feb. 12, 1907.

Application filed December 4, 1905. Serial No. 290,086.

*To all whom it may concern:*

Be it known that I, GEORGE BULLOCK, a citizen of the United States, residing at Poplar Bluff, Missouri, have invented a new and useful Eye-Exerciser, of which the following is a specification.

This invention relates to eye-exercisers; and the object thereof is to provide an instrument in the general form of a spectacle-frame which is adapted to be held under yielding tension against the eyelids and gently compress the same against the eye-balls, thereby resulting in stronger muscular development at those parts.

In the drawings, wherein I have illustrated one form of my invention, Figure 1 is a general perspective view of one form of instrument conforming to the principles of the invention, and Fig. 2 is a top view thereof. Fig. 3 is a view of a slightly-modified construction of the temple-pieces.

The rings 1 are intended to bear against the upper and lower eyelids and are of such size and shape that they will impart the necessary pressure without obstruction by the eye socket or cavity. The said rings may be of any suitable material, such as gold, silver, celluloid, or other substances suitable for such purposes. The rings are joined by an arch or bridge 2, which holds them in proper relative adjustment and which is arranged large enough not to engage the nose. A temple-piece 3, extending forward and then bent backward, as indicated at 4, is attached to each ring. This bending is for the purpose of leaving space, so that the sides will not bear against the temples or eye-sockets when the instrument is applied. They may be rigid sides, as shown in Figs. 1 and 2, or may be composed of two pieces hinged together, as shown and indicated by 10 in Fig. 3, so so that the sides may be folded over against the rings. In either instance I prefer that small springs 6 be connected to the rear ends of the temple-pieces 3 and that said springs shall terminate in hooks 7 for engagement behind the ears. In such adjustment the tension and length of the springs 6 and sides 3 having been previously adjusted the rings 1 will be drawn and held with the desired pressure against the lids of the eyes, thereby affording opportunity for consistent exercise so long as the instrument is worn. Thereby the eye-muscles will be greatly strengthened and encouraged in their functions.

Eyes 8 may be formed at the upper ports of the hooks 7, Fig. 1, for engagement with the ends of a section 9, of rubber or elastic, intended to pass around behind the head, and thereby draw the rings 1 against the eyes. This may be in the place of or in addition to the springs 6 and may be regulated to suit different instances.

What I claim as new, and desire to secure by Letters Patent of the United States, is—

1. An eye-exerciser, comprising two rings, a bridge connecting said rings, a temple-piece connected to each ring, eyes formed on said temple-pieces, and an elastic connection fastened to said eyes, substantially as specified.

2. An instrument for maintaining continuous and uniform pressure against the upper and lower eyelids comprising, two rings arranged to press against the eyelids within the eye sockets or cavities, a bridge connecting said two rings and arched beyond possible engagement with the nose, forwardly-arched temple-pieces connected to said rings, springs connected to the rear ends of said temple-pieces, and ear-hooks on the rear ends of said springs to coöperate with said springs to force said two rings against the eyelids continuously and uniformly with any desired degree of pressure, substantially as and for the purpose specified.

3. In an eye-exerciser, the combination of two rings arranged to bear against the eyelids within the eye sockets or cavities, a bridge connecting said two rings and arched beyond possible engagement with the nose while in use, forwardly-arched temple-pieces connected to said rings, and automatic means in connection with said arched temple-pieces to force said rings against the eyelids with any predetermined degree of pressure when the device is in use, substantially as specified.

4. As an article of manufacture, an eye-exerciser comprising in combination, two rings arranged to bear against the upper and lower eyelids within the eye sockets or cavities, a bridge connecting said two rings and arched beyond possible engagement with the nose while in use, a forwardly-arched member attached to the outer side of each ring, a temple-piece hinged to each of said arched members, hooks at the rear ends of said temple-pieces adapted to engage behind the ears, means whereby an elastic connection may be connected to said temple-pieces, and automatic means separate from such connection in connection with said temple-pieces and hooks to press said rings continuously and uniformly against the eyelids when the device is in use, substantially as specified.

5. An eye-exerciser comprising two rings arranged to bear against the eyelids, forwardly-arched members 4 connected to said rings, temple-pieces hinged to said members, automatic means to hold said rings against the eyelids, and a bridge connecting said two rings and arched beyond possible engagement with the nose, substantially as specified.

6. An instrument of the character described comprising two rings, a bridge connected to said rings, a forwardly-arched temple-piece fastened to each ring, a spring connected to each temple-piece, a hook connected to each spring, eyes formed on said hooks, and an elastic connection fastened to said hooks.

In testimony whereof I hereto affix my signature in the presence of two witnesses.

GEORGE BULLOCK. [L. S.]

Witnesses:
F. J. McCaslin,
John D. Rippey.